(12) United States Patent
Yang

(10) Patent No.: US 10,790,968 B2
(45) Date of Patent: Sep. 29, 2020

(54) LEDGER VERIFICATION METHOD AND APPARATUS, AND DEVICE

(71) Applicant: Alibaba Group Holding Limited, George Town (KY)

(72) Inventor: Xinying Yang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/815,882

(22) Filed: Mar. 11, 2020

(65) Prior Publication Data
US 2020/0213094 A1 Jul. 2, 2020

Related U.S. Application Data

(63) Continuation of application No. PCT/CN2020/071183, filed on Jan. 9, 2020.

(30) Foreign Application Priority Data

Apr. 4, 2019 (CN) .......................... 2019 1 0272426

(51) Int. Cl.
H04L 29/06 (2006.01)
H04L 9/06 (2006.01)
G06F 16/903 (2019.01)
H04L 9/32 (2006.01)

(52) U.S. Cl.
CPC .......... H04L 9/0643 (2013.01); G06F 16/903 (2019.01); H04L 9/3263 (2013.01); H04L 2209/38 (2013.01)

(58) Field of Classification Search
CPC . H04L 9/0643; H04L 9/3263; H04L 2209/38; G06F 16/903
See application file for complete search history.

(56) References Cited

U.S. PATENT DOCUMENTS

| 10,164,779 | B2 * | 12/2018 | Uhr | ........................... H04L 9/32 |
| 10,572,855 | B1 * | 2/2020 | Levy | .................... G06Q 10/087 |
| 2018/0136633 | A1 * | 5/2018 | Small | .................... G06Q 20/065 |
| 2019/0007199 | A1 | 1/2019 | Davis | |

(Continued)

FOREIGN PATENT DOCUMENTS

| CN | 105790954 | 7/2016 |
| CN | 106357701 | 1/2017 |

(Continued)

OTHER PUBLICATIONS

U.S. Appl. No. 16/815,893, filed Mar. 11, 2020, Yang.

(Continued)

Primary Examiner — Sarah Su
(74) Attorney, Agent, or Firm — Fish & Richardson P.C.

(57) ABSTRACT

Computer-implemented methods, non-transitory, computer-readable media, and computer-implemented systems for ledger verification are provided. If a user needs to audit or verify a block-chain type ledger, a time service certificate can be used as an anchor to verify a segment of a ledger corresponding to the anchor. Because a timestamp of the segment of the ledger uses the time service certificate as trustworthiness attestation, verification based on the time service certificate can ensure time validity and correctness of the segment of the ledger.

20 Claims, 5 Drawing Sheets

(56) References Cited

U.S. PATENT DOCUMENTS

| | | | |
|---|---|---|---|
| 2019/0182047 A1* | 6/2019 | Andreina | H04L 63/0428 |
| 2019/0213333 A1* | 7/2019 | Williams | G06F 21/64 |
| 2019/0334700 A1* | 10/2019 | Callan | G06F 16/1834 |
| 2019/0354964 A1* | 11/2019 | Snow | G06F 21/00 |
| 2019/0363892 A1* | 11/2019 | Wang | H04L 9/3297 |
| 2019/0370486 A1* | 12/2019 | Wang | G06Q 20/401 |
| 2019/0372781 A1* | 12/2019 | Ra, II | H04L 9/3263 |
| 2020/0058055 A1* | 2/2020 | Simha | G06Q 30/0279 |
| 2020/0210407 A1* | 7/2020 | Yang | H04L 9/0637 |
| 2020/0218815 A1* | 7/2020 | Haque | G06F 21/62 |

FOREIGN PATENT DOCUMENTS

| | | |
|---|---|---|
| CN | 108540291 | 9/2018 |
| CN | 109308211 | 2/2019 |
| CN | 109508984 | 3/2019 |

OTHER PUBLICATIONS

U.S. Appl. No. 16/815,902, filed Mar. 11, 2020, Yang.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

\* cited by examiner

LEDGER VERIFICATION METHOD AND APPARATUS, AND DEVICE

CROSS-REFERENCE TO RELATED APPLICATIONS

This application is a continuation of PCT Application No. PCT/CN2020/071183, filed on Jan. 9, 2020, which claims priority to Chinese Patent Application No. 201910272426.5, filed on Apr. 4, 2019, and each application is hereby incorporated by reference in its entirety.

TECHNICAL FIELD

Implementations of the present specification relate to the field of information technologies, and in particular, to ledger verification methods and apparatuses and devices.

BACKGROUND

In a block-chain type ledger that stores data based on a blockchain data structure (e.g., in a form of a blockchain), data is difficult to tamper with. Because the stored data is usually generated by multi-party participation, full or partial verification of the ledger is often needed. Verification is usually performed starting from the genesis block to a target data block when processing verification. However, in a centralized scenario, a service party and a database service provider may jointly make false accounts in order to avoid auditing.

Based on this, an effective method for verifying a block-chain type ledger in a centralized scenario is needed.

SUMMARY

An objective of the implementations of the present application is to provide methods for implementing flexible verification in a block-chain type ledger.

To alleviate the previous technical problem, the implementations of the present application are implemented as follows:

A block-chain type ledger verification method is applied to a centralized database service provider that stores data by using multiple data blocks, including: determining at least one time service certificate, where any time service certificate corresponds to a continuous segment of a ledger, and the time service certificate includes a start data block height, an end data block height, a trusted timestamp, and a root hash of the segment of the ledger, so as to clarify a generation time of the segment of the ledger; obtaining hash values of data blocks between the start data block height and the end data block height, and constructing a Merkle tree corresponding to the segment of the ledger, to determine a root hash of the Merkle tree; and verifying consistency between the root hash of the segment of the ledger and the root hash of the Merkle tree; where in the block-chain type ledger, except an initial data block, each data block includes at least one data record and includes its own hash value that is determined by both the data record included in the data block and a hash value of a previous data block, and block heights of data blocks are increased monotonically based on a block generation time sequence.

Correspondingly, an implementation of the present specification further provides a block-chain type ledger verification apparatus, applied to a centralized database service provider that stores data by using multiple data blocks, including: a determining module, configured to determine at least one time service certificate, where any time service certificate corresponds to a continuous segment of a ledger, and the time service certificate includes a start data block height, an end data block height, a trusted timestamp, and a root hash of the segment of the ledger, so as to clarify a generation time of the segment of the ledger; an obtaining module, configured to obtain hash values of data blocks between the start data block height and the end data block height, and construct a Merkle tree corresponding to the segment of the ledger, to determine a root hash of the Merkle tree; and a verification module, configured to verify consistency between the root hash of the segment of the ledger and the root hash of the Merkle tree; where in the block-chain type ledger, except an initial data block, each data block includes at least one data record and includes its own hash value that is determined by both the data record included in the data block and a hash value of a previous data block, and block heights of data blocks are increased monotonically based on a block generation time sequence.

In the solutions provided in implementations of the present application, when any user needs to audit or verify a block-chain type ledger, a time service certificate can be used as an anchor to verify a segment of a ledger corresponding to the anchor. Because a timestamp of the segment of the ledger uses the time service certificate as trustworthiness attestation, verification based on the time service certificate can ensure time validity and correctness of the segment of the ledger.

It should be understood that the previous general description and the following detailed description are merely exemplary and illustrative, and cannot limit the implementations of the present specification.

In addition, there is no need for any implementation of the present specification to achieve full effects described above.

BRIEF DESCRIPTION OF DRAWINGS

To describe the technical solutions in the implementations of the present specification or in the existing technology more clearly, the following briefly describes the accompanying drawings needed for describing the implementations or the existing technology. Clearly, the accompanying drawings in the following description merely show some implementations of the present specification, and a person of ordinary skill in the art can still derive other drawings from these accompanying drawings.

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

The technical solutions provided in the implementations of the present specification are described in detail below with reference to the accompanying drawings. First, notably, a database service provider in the present specification provides a data service in a centralized manner.

Figure 1:
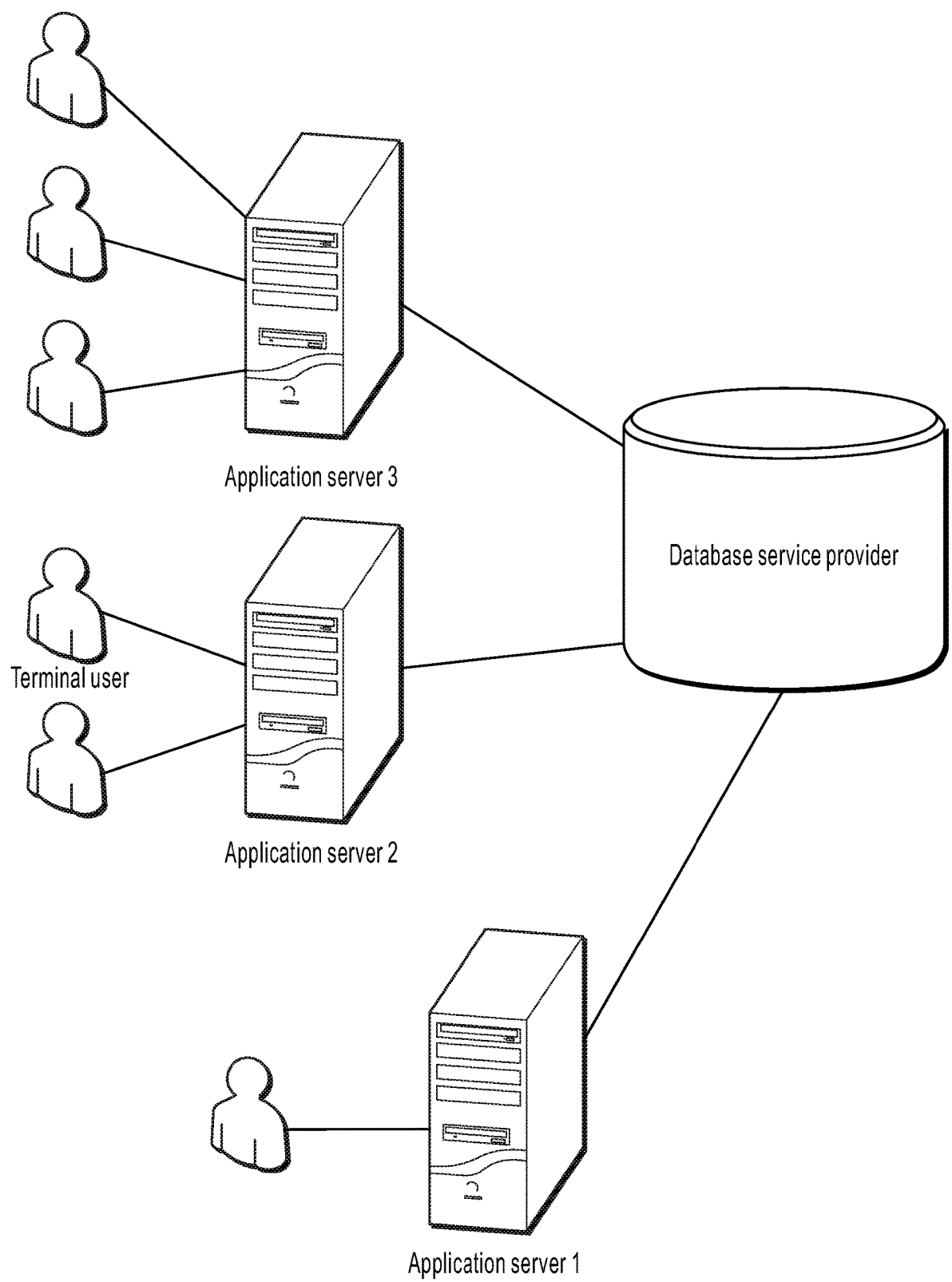
FIG. 1 is a schematic diagram illustrating a system architecture involved in the existing technology.

In a current server architecture, a database server can directly interconnect to a client device of an individual user; or some application servers can interconnect to client devices of individual users, while a database server interconnects to the application servers. FIG. 1 is a schematic diagram illustrating a system architecture involved in the existing technology.

A data block is generated in advance at the centralized database service provider in the implementation of the present specification in the following way:

A data record to be stored is received, and a hash value of each data record is determined. The data record to be stored can be various consumption records of a client device of an individual user, or can be a service result, an intermediate state, or an operation record, etc. that is generated when an application server executes service logic based on an instruction of the user. A specific service scenario can include a consumption record, an audit log, a supply chain, a government supervision record, and a medical record, etc.

When a predetermined block generation condition is reached, each data record to be written into a data block is determined, and the Nth data block that includes a hash value of the data block and the data record is generated.

The predetermined block generation condition includes the following: a quantity of data records to be stored reaches a quantity threshold. For example, one new data block is generated each time a quantity of received data records reaches 1000, and the 1000 data records are written into the block; or a time interval from a previous block generation moment reaches a time threshold, for example, one new data block is generated every 5 minutes, and data records received in the 5 minutes are written into the block.

N here refers to a sequence number of a data block. In other words, in the implementation of the present specification, the data blocks are arranged in a blockchain-based form in a block generation time sequence, and have a strong time sequence characteristic. Block heights of the data blocks are increased monotonically based on the block generation time sequence. A block height can be a sequence number. In this case, a block height of the Nth data block is N. The block height can also be generated by using another method.

When N=1, the data block is an initial data block. A hash value and a block height of the initial data block are given based on a predetermined method. For example, if the initial data block does not include a data record, the hash value is any given hash value, and the block height blknum=0. For another example, a trigger condition for generating the initial data block is the same as a trigger condition for another data block, but the hash value of the initial data block is determined by performing a hash operation on all content in the initial data block.

When N>1, because content and a hash value of a previous data block are already determined, a hash value of a current data block (the Nth data block) can be generated based on the hash value of the previous data block (that is, the (N−1)th data block). For example, in a feasible method, a hash value of each data record to be written into the Nth data block is determined, and a Merkle tree is generated based on a sequence of the data records in the block. Then, a root hash value of the Merkle tree is combined with the hash value of the previous data block to generate the hash value of the current block by using a hash algorithm again. For another example, combination can be performed based on a sequence of the data records in the block and a hash operation can be performed to obtain a hash value of the overall data records. Then, the hash value of the previous data block is combined with the hash value of the overall data records, and a hash operation is performed on a string obtained through the combination to generate the hash value of the data block.

In the previous data block generation method, each data block can be determined by using a hash value, and the hash value of the data block can be determined by content and a sequence of data records in the data block and the hash value of the previous data block. A user can initiate verification at any time based on a hash value of a data block. Modification to any content in the data block (including modification to content or a sequence of data records in the data block) causes inconsistency between a hash value of the data block that is calculated during verification and a hash value obtained when the data block is generated. Consequently, the verification fails and tamper-resistance can be implemented in the centralized manner.

Notably, when the data block is generated, a block generation time is generally given by the database service provider.

Figure 2:
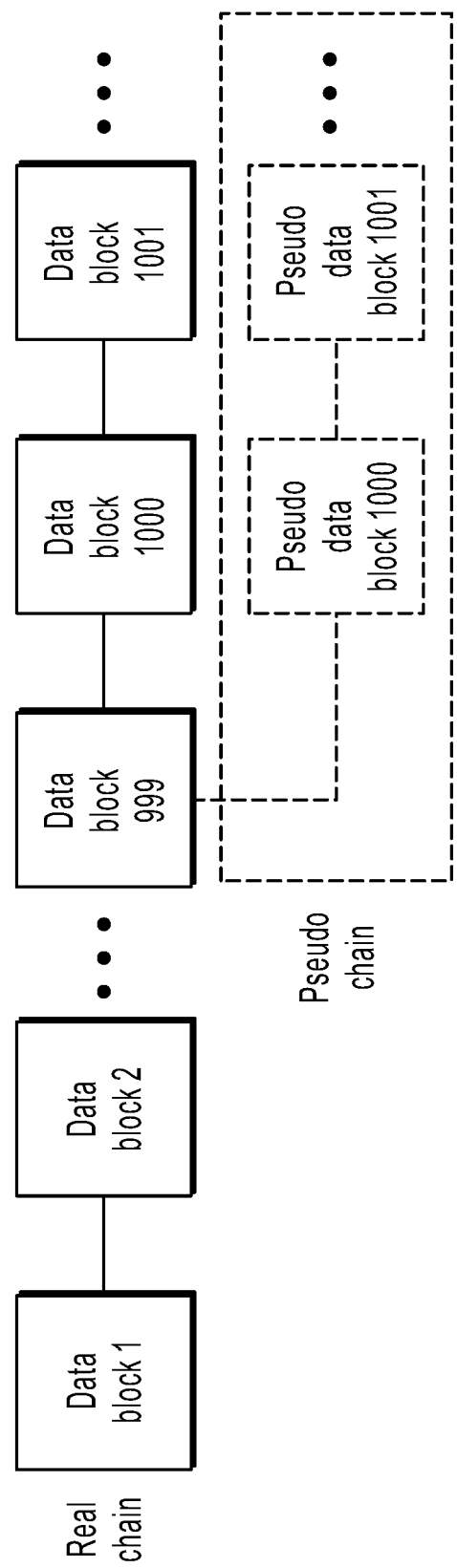
FIG. 2 is a schematic diagram illustrating a pseudo chain, according to an implementation of the present specification.

In the previous method, data in a data block cannot be tampered with. However, if a third party needs to audit the ledger, the following possibility still exists: The database service provider and a service party cooperate to generate a related pseudo chain based on the previous generation method starting from a certain data block, so that a new ledger that is partially the same as the original ledger is formed to avoid the related audit and verification. FIG. 2 is a schematic diagram illustrating a pseudo chain, according to an implementation of the present specification. A data block generation method in a process of generating the pseudo chain is the same as the previous block generation method.

In the schematic diagram, after the ledger has recorded many data blocks, if the service party considers that a data record in the 1000th data block has a problem, the service party may cooperate with the database service provider to generate another data block as the 1000th data block, append the data block behind the 999th data block, and replace data blocks starting from the 1000th data block, so that a pseudo chain partially the same as the original ledger is formed and the previous problem can be hidden from verification and audit. A third party cannot distinguish between a pseudo chain and a real chain.

Based on this, an implementation of the present specification provides a ledger verification method that is based on a time service certificate, so as to ensure ledger validity and correctness.

Figure 3:
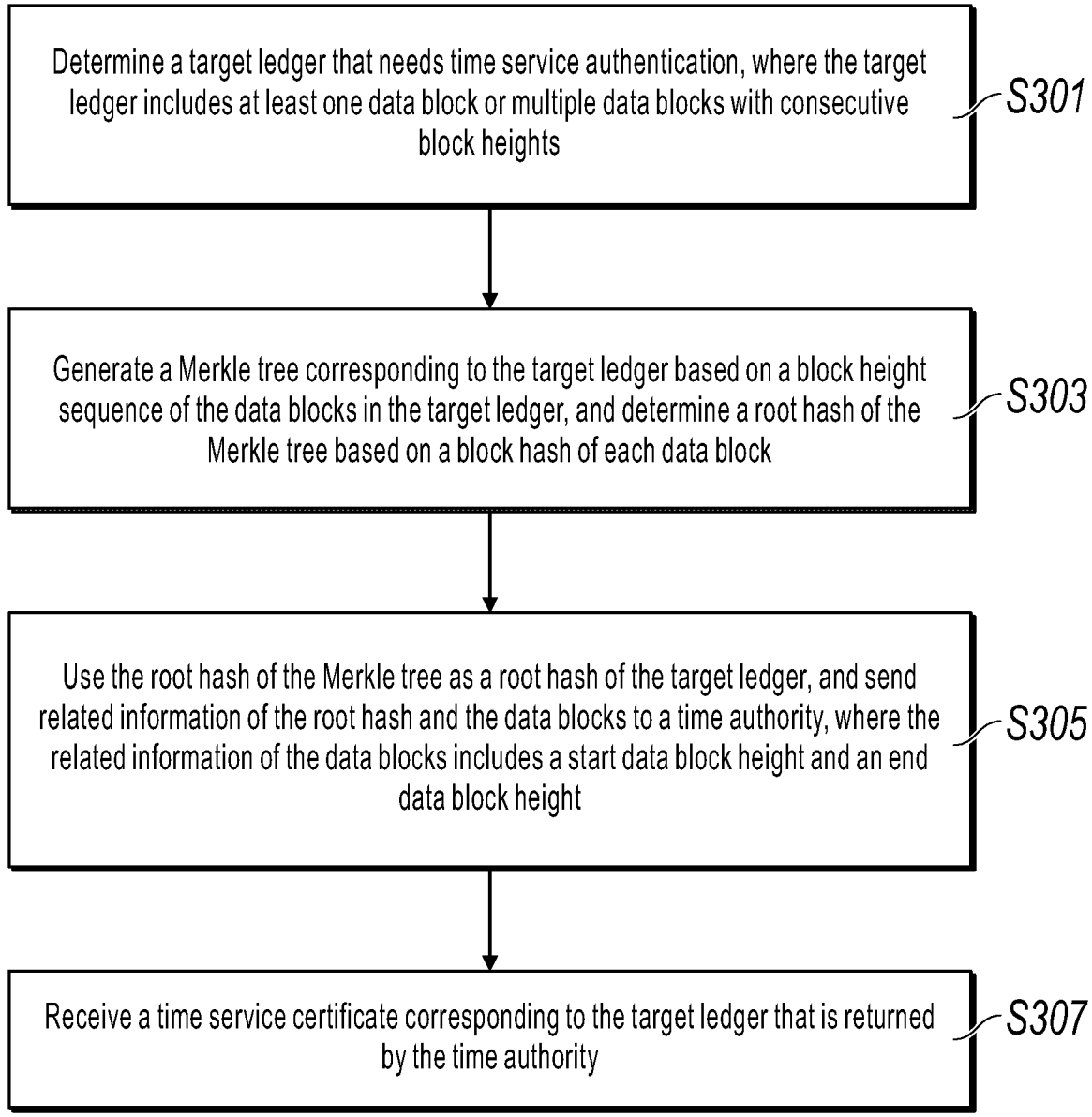
FIG. 3 is a schematic flowchart illustrating time service certificate generation, according to an implementation of the present specification.

For ease of understanding, a generation method and content of a time service certificate are described first. FIG. 3 is a schematic flowchart illustrating time service certificate generation, according to an implementation of the present specification, including the following steps.

S301: Determine a target ledger that needs time service authentication, where the target ledger includes at least one data block or multiple data blocks with consecutive block heights.

As described above, in the block-chain type ledger, except an initial data block, each data block includes at least one data record and includes its own hash value that is determined by both the data record included in the data block and a hash value of a previous data block, and block heights of data blocks are increased monotonically based on a block generation time sequence.

Specifically, a service provider first determines, from data blocks that have been generated and stored, a segment of a ledger that needs time service authentication. The segment of the ledger includes at least one data block or multiple data blocks with consecutive block heights. A determining method can be specified based on a user operation. For example, a user initiates a time service instruction, and the instruction includes a start block height and a block quantity that are needed for the time service authentication. The segment of the ledger is used as a target ledger.

The target ledger can also be automatically specified by the service provider based on predetermined service logic, instead of being specified by a user. For example, in terms of the finest granularity, time service application is available for each data block. In such a method, a root hash of a Merkle tree of a segment of a ledger is a block hash value of the data block. The method can ensure authenticity of a ledger (namely, each data block) to the maximum extent. The method causes relatively high cost overheads for both a time service center and the service provider due to a high data block generation frequency.

In an optional method, a specific predetermined time service condition is set, and when the predetermined time service condition is satisfied, a time service request is initiated. When newly generated data blocks are all considered as data blocks that are about to undergo time service authentication, the predetermined time service condition can be as follows: A quantity of data blocks that are about to undergo time service authentication reaches a quantity threshold, or a time interval from previous time service authentication reaches a time threshold.

S303: A Merkle tree corresponding to the target ledger is generated based on a block height sequence of the data blocks in the target ledger, and a root hash of the Merkle tree is determined based on a block hash of each data block.

Due to dependency of chained data blocks in the blockchain type ledgers, the Merkle tree here only needs to be generated based on a sequence of the data blocks. A conventional calculation method is used as a specific root hash calculation method, and details are omitted here for simplicity.

S305: Use the root hash of the Merkle tree as a root hash of the target ledger, and send the root hash and related information of the data blocks to a time authority, where the related information of the data blocks includes a start data block height and an end data block height.

The time authority can be the National Time Service Center or a corresponding time service institution authorized by the National Time Service Center. The time authority provides a trusted timestamp upon receiving the previous information, and performs digital signature authentication on the trusted timestamp to generate a time service certificate that includes the trusted timestamp and a digital signature. The time service certificate can further include related information of the previous data blocks, and a digital signature method can be conventional private key-based encryption and public key-based decryption.

S307: Receive a time service certificate that corresponds to the target ledger and that is returned by the time authority, where the time service certificate includes the start data block height, the end data block height, a trusted timestamp, and the root hash of the target ledger.

Therefore, the database service provider can receive a series of trusted time service certificates that each include a signature of the time authority, and each time service certificate includes a trusted timestamp and corresponds to a segment of ledger. The time service certificate can prove that the segment of the ledger corresponding to the time service certificate is generated before the trusted timestamp. A specific partial ledger can be clarified by using related information in the time service certificate. The database service provider can correspondingly manage and verify the series of time service certificates.

For example, the database service provider can sequentially number each time service certificate. A time service certificate-related database or index can be established. The database or the index includes a mapping table between a time service certificate number and a root hash value of a segment of a ledger corresponding to a start data block height, an end data block height, and a time service certificate.

Figure 4:
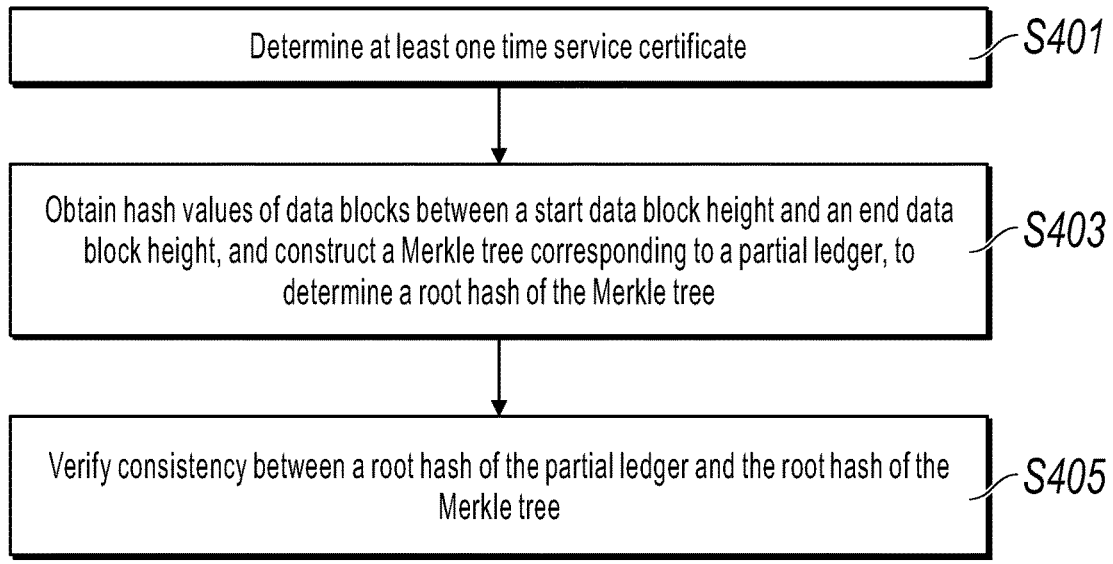
FIG. 4 is a schematic flowchart illustrating a ledger verification method, according to an implementation of the present specification.

After a time service certificate is obtained, a ledger can be verified based on the time service certificate. FIG. 4 is a schematic flowchart illustrating a ledger verification method, according to an implementation of the present specification, including the following steps.

S401: Determine at least one time service certificate.

As described above, any time service certificate corresponds to a continuous segment of a ledger, and the time service certificate includes a start data block height, an end data block height, a trusted timestamp, and a root hash of the segment of the ledger, so as to clarify a generation time of the segment of the ledger.

Full verification or random verification can be performed. For random verification, one or more time service certificates can be randomly selected, and then a segment of a ledger corresponding to each time service certificate is verified. For full verification, all time service certificates need to be obtained and be verified based on a sequence of the time service certificates.

In an implementation, a corresponding time service certificate can be further determined based on a time specified by a user. For example, based on an actual need, it is determined that ledgers generated within a certain time period [a, b] are problematic and need to be audited. In this case, a time service certificate with an included trusted timestamp falling inside the previous time interval can be obtained as an object to be verified. Or, a time service certificate with an interval between its trusted timestamp and a specified time point being less than a predetermined value can be obtained as an object to be verified.

A time service certificate can uniquely determine a segment of a ledger corresponding to the time service certificate. A start data block height and an end data block height of the segment of the ledger are included in the time service certificate. In addition, the time service certificate further includes a trusted timestamp. If a timestamp in a data record included in a segment of a ledger is after the trusted timestamp, or a difference between the trusted timestamp in the time service certificate and a trusted timestamp in a neighboring time service certificate is excessively large, it can be directly determined that the segment of the ledger is problematic.

For example, a trusted timestamp included in time service certificate 2 is 00:00 on Jun. 1, 20xx, assuming that one time service certificate can be obtained through application on an average about 10 minutes for a ledger.

If it is found that a trusted timestamp of time service certificate 1 previous to time service certificate 2 is 00:00 on Mar. 1, 20xx, it can be determined that an interval between a generation time of a segment of a ledger corresponding to time service certificate 2 and a generation time of a previous partial ledger is excessively large. Therefore, a current chain may be a pseudo chain.

Or, if it is found that a timestamp of a data record included in a certain data block corresponding to time service certificate 2 is 00:00 on Jul. 1, 20xx, it indicates that a time clarified by the time service certificate is before a time of service data, which is also a problematic. In short, the trusted timestamp of the time service certificate can be used to clarify the generation time of the segment of the ledger, and further to verify time consistency of ledgers corresponding to the time service certificate.

S403: Obtain hash values of data blocks between the start data block height and the end data block height, and construct a Merkle tree corresponding to the segment of the ledger, to determine a root hash of the Merkle tree.

A hash value of each data block can be obtained through calculation for a segment of a ledger corresponding to a time service certificate. If time consistency of the segment of the ledger is normal, a Merkle tree (Merkle Tree) corresponding to the segment of the ledger can be further constructed. In the Merkle tree, each leaf node is a block hash of one data block, and therefore a root hash of the Merkle tree can be obtained.

S405: Verify consistency between the root hash of the segment of the ledger and the root hash of the Merkle tree.

A method for calculating the root hash of the segment of the ledger in the time service certificate is the same as a method for calculating the root hash of the Merkle tree. Therefore, when no data record in the segment of the ledger is modified, the root hash of the segment of the ledger is the same as the root hash of the Merkle tree. Any modification to the segment of the ledger can cause inconsistency between the two root hashes. Therefore, correctness of the segment of the ledger corresponding to the time service certificate can be verified by using the previously described method.

In the solutions provided in implementations of the present application, when any user needs to audit or verify a block-chain type ledger, a time service certificate can be used as an anchor to verify a segment of a ledger corresponding to the anchor. Because a timestamp of the segment of the ledger uses the time service certificate as trustworthiness attestation, verification based on the time service certificate can ensure time validity and correctness of the segment of the ledger.

In an implementation, during time service certificate determining, a user can further input a specified block height, so that block heights corresponding to time service certificates can be queried to determine a specific time service certificate corresponding to the block height, where the block height falls in a range of the specific time service certificate. In addition, a segment of a ledger corresponding to the time service certificate can be queried.

In an implementation, during time service certificate determining, a time service certificate can further be obtained directly from a pre-established time service certificate index. As described above, a database service provider can pre-establish a time service certificate-related database or index, where the time service certificate index includes a mapping relationship among a data block height, a data block hash value, and a time service certificate. Therefore, a corresponding time service certificate can be directly obtained based on an input block height.

In an implementation, to verify a plurality of segments of ledgers corresponding to multiple time service certificates, a trusted timestamp included in each time service certificate can be first determined. Then, the plurality of segments of ledgers can be verified based on a chronological order of the trusted timestamps. Therefore, if a verification error occurs when a segment of a ledger corresponding to a certain time service certificate ranked ahead, a subsequent partial ledger no longer needs to be verified. Verification here refers to steps from S403 to S405.

In an implementation, if a time service certificate corresponds to a full ledger during generation, that is, if the last data block in a segment of a ledger corresponding to a previous time service certificate is a parent data block of the first data block in a segment of a ledger corresponding to a next time service certificate (for example, each new data block has one corresponding time service certificate), the full ledger can further be split into multiple segments of ledgers based on a sequence of all time service certificates by using the time service certificates as anchors, and the multiple segments of ledgers can be sequentially verified. Verification here refers to steps from S403 to S405.

Figure 5:
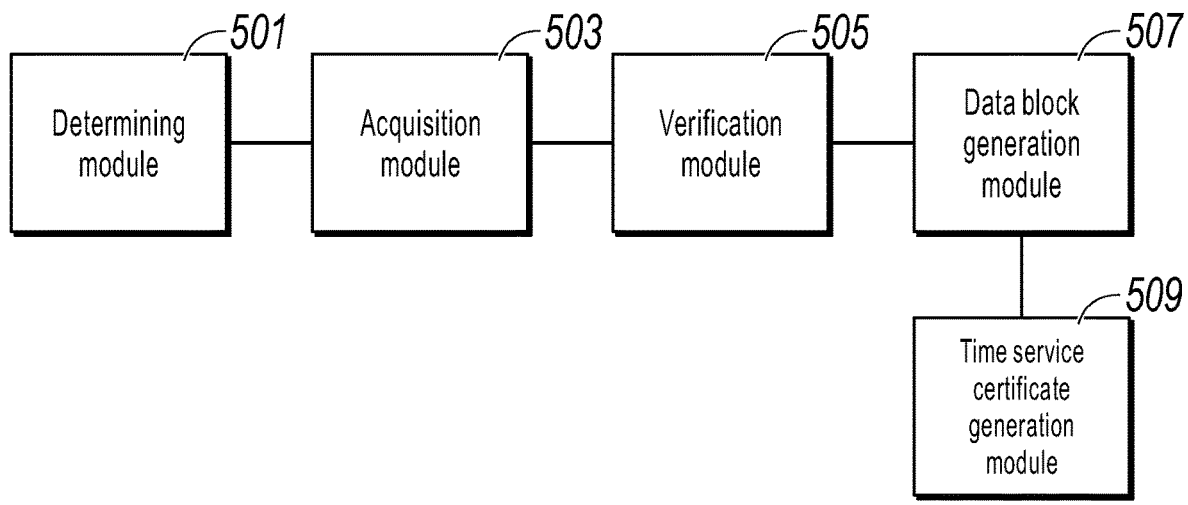
FIG. 5 is a schematic structural diagram illustrating a ledger verification apparatus, according to an implementation of the present specification.

Correspondingly, an implementation of the present specification further provides a ledger verification apparatus, as shown in FIG. 5. FIG. 5 is a schematic structural diagram illustrating the ledger verification apparatus, according to the implementation of the present specification. The apparatus is applied to a centralized database service provider that stores data by using multiple data blocks and includes the following: a determining module 501, configured to determine at least one time service certificate, where any time service certificate corresponds to a continuous segment of a ledger, and the time service certificate includes a start data block height, an end data block height, a trusted timestamp, and a root hash of the segment of the ledger, so as to clarify a generation time of the segment of the ledger; an obtaining module 503, configured to obtain hash values of data blocks between the start data block height and the end data block height, and construct a Merkle tree corresponding to the segment of the ledger, to determine a root hash of the Merkle tree; and a verification module 505, configured to verify consistency between the root hash of the segment of the ledger and the root hash of the Merkle tree; where in the block-chain type ledger, except an initial data block, each data block includes at least one data record and includes its own hash value that is determined by both the data record included in the data block and a hash value of a previous data block, and block heights of data blocks are increased monotonically based on a block generation time sequence.

Further, when there are multiple time service certificates, the verification module 505 is further configured to determine a segment of a ledger corresponding to each time service certificate and a trusted timestamp included in each time service certificate; and verify multiple segments of ledgers in a chronological order of the trusted timestamps.

Further, the determining module 501 is further configured to receive an input data block height, and obtain a time service certificate from a pre-established time service certificate index based on the block height; where a time service certificate index includes a mapping relationship among a data block height, a data block hash value, and a time service certificate.

Further, the apparatus further includes a data block generation module 507, configured to receive a data record to be stored, and determine a hash value of each data record; and when a predetermined block generation condition is reached, determine each data record to be written into a data block and generate the Nth data block that includes a hash value of the data block and the data record, specifically including: when N=1, giving a hash value and a block height of the initial data block based on a predetermined method; and when N>1, determining the hash value of the Nth data block based on each data record to be written into the data block and a hash value of the (N−1)th data block, and generating the Nth data block that includes the hash value of the Nth data block, each data record, and a block generation time of the data block, where block heights of data blocks are increased monotonically based on a block generation time sequence.

Further, the apparatus further includes a time service certificate generation module 509, configured to determine a target ledger that needs time service authentication, where the target ledger includes at least one data block or multiple data blocks with consecutive block heights; generate a Merkle tree corresponding to the target ledger based on a block height sequence of the data blocks in the target ledger, and determine a root hash of the Merkle tree based on a block hash of each data block; use the root hash of the Merkle tree as a root hash of the target ledger, and send the root hash and related information of the data blocks to a time authority, where the related information of the data blocks includes a start data block height and an end data block height; and receive a time service certificate that corresponds to the target ledger and that is returned by the time authority, where the time service certificate includes the start data block height, the end data block height, a trusted timestamp, and the root hash of the target ledger.

Further, the time service certificate generation module 509 is further configured to determine each new data block as a target ledger; or determine, based on a start data block height and an end data block height that are determined by an instruction of a user, a continuous segment of a ledger starting from the start data block height to the end data block height, and use the segment of the ledger as the target ledger.

An implementation of the present specification further provides a computer device. The computer device includes at least a memory, a processor, and a computer program that is stored in the memory and that can run on the processor. When executing the program, the processor performs the ledger verification method shown in FIG. 4.

Figure 6:
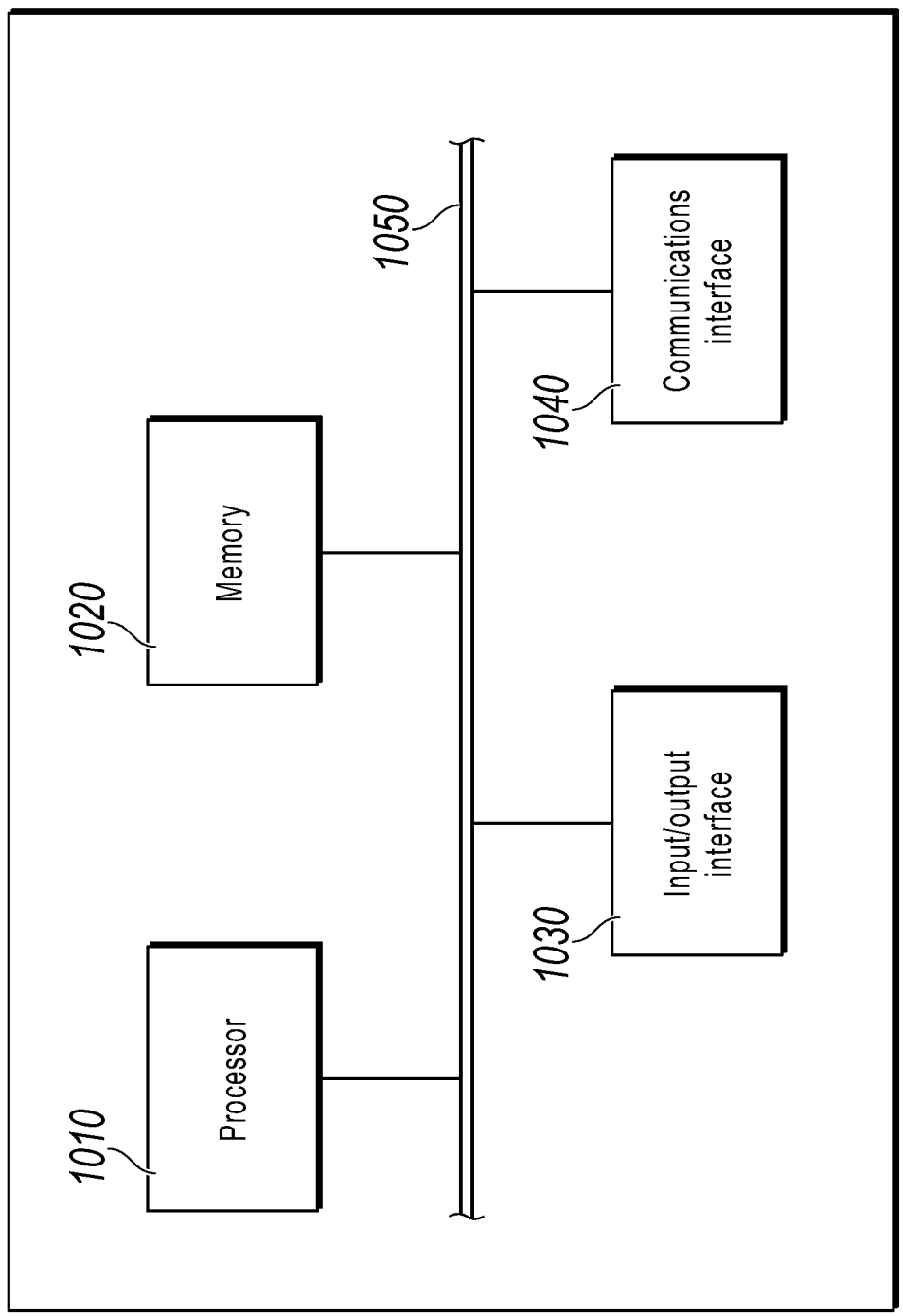
FIG. 6 is a schematic structural diagram illustrating a device for configuring a method in an implementation of the present specification.

FIG. 6 is a more detailed schematic structural diagram illustrating a hardware structure of a computing device, according to an implementation of the present specification. The device can include a processor 1010, a memory 1020, an input/output interface 1030, a communications interface 1040, and a bus 1050. The processor 1010, the memory 1020, the input/output interface 1030, and the communications interface 1040 are connected to and communicate with each other inside the device by using the bus 1050.

The processor 1010 can be implemented by using a general central processing unit (CPU), a microprocessor, an application-specific integrated circuit (ASIC), one or more integrated circuits, etc., and is configured to execute a related program, so as to implement the technical solutions provided in the implementations of the present specification.

The memory 1020 can be implemented by using a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is called and executed by the processor 1010.

The input/output interface 1030 is configured to connect to an input/output device, to input or output information. The input/output device (not shown in the figure) can be used as a component and configured in the device, or can be externally connected to the device, to provide a corresponding function. The input device can include a keyboard, a mouse, a touchscreen, a microphone, various sensors, etc. The output device can include a display, a speaker, a vibrator, an indicator, etc.

The communications interface 1040 is configured to connect to a communications module (not shown in the figure), to implement communication interaction between the device and another device. The communications module can perform communication by using a wired (for example, USB or a network cable) or wireless (for example, a mobile network, Wi-Fi, or Bluetooth) method.

The bus 1050 includes one channel, used to transmit information between components (for example, the processor 1010, the memory 1020, the input/output interface 1030, and the communications interface 1040) of the device.

Notably, although only the processor 1010, the memory 1020, the input/output interface 1030, the communications interface 1040, and the bus 1050 of the device are shown, during specific implementation, the device can further include other components necessary for normal running. In addition, a person skilled in the art can understand that the device can include only components necessary for implementing the solutions in the implementations of the present specification, but does not necessarily include all components shown in the figure.

An implementation of the present specification further provides a computer readable storage medium. The computer readable storage medium stores a computer program, and when executed by a processor, the program can implement the ledger verification method shown in FIG. 4.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media (transitory media) such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations mutually. Each implementation focuses on a difference from other implementations. Particularly, an apparatus implementation is similar to a method implementation, and therefore is described briefly. For a related part, references can be made to some descriptions in the method implementation. The previously described apparatus implementations are merely examples. The modules described as separate parts can or cannot be physically separate. During implementation of the solutions in the implementations of the present specification, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present specification. It should be noted that a person of ordinary skill in the art can further make several improvements or polishing without departing from the principle of the implementations of the present specification, and the improvements or polishing shall fall within the protection scope of the implementations of the present specification.

What is claimed is:

1. A computer-implemented method for ledger verification, comprising:
   determining, by a centralized database service provider that stores data in a ledger that comprises a plurality of data blocks stored in a blockchain data structure, at least one time service certificate, wherein each of the at least one time service certificate corresponds to a segment of the ledger that is continuous, the each of the at least one time service certificate comprises a start data block height, an end data block height, a trusted timestamp, and a root hash of the segment of the ledger, and the at least one time service certificate clarifies a generation time of the segment of the ledger;
   obtaining hash values of data blocks between the start data block height and the end data block height;
   constructing a Merkle tree corresponding to the segment of the ledger;
   determining a root hash of the Merkle tree; and
   verifying consistency between the root hash of the segment of the ledger and the root hash of the Merkle tree, wherein in the ledger, except for an initial data block, each of the plurality of data blocks comprises at least one data record and comprises its own hash value that is determined by the at least one data record comprised in the data block and a hash value of a previous data block, and block heights of data blocks are increased monotonically according to a block generation time sequence.

2. The computer-implemented method according to claim 1, wherein the at least one time service certificate comprises a plurality of time service certificates, and the computer-implemented method further comprises:
   determining a plurality of segments of ledgers corresponding to the plurality of time service certificates and a plurality of trusted timestamps comprised in the plurality of time service certificates, respectively; and
   sequentially verifying the plurality of segments of ledgers in a chronological order of the plurality of trusted timestamps.

3. The computer-implemented method according to claim 1, wherein determining at least one time service certificate comprises:
   receiving an input data block height; and
   obtaining a time service certificate from a pre-established time service certificate index based on the input data block height, wherein the pre-established time service certificate index comprises a mapping relationship among a data block height, a data block hash value, and the time service certificate.

4. The computer-implemented method according to claim 1, further comprising generating a data block in advance at the centralized database service provider by:
   receiving a data record to be written in an Nth data block;
   determining a hash value of the data record; and
   if a predetermined block generation condition is reached:
      determining the data record; and
      generating the Nth data block that comprises the data record and the hash value of the data block.

5. The computer-implemented method according to claim 4, wherein generating the Nth data block that comprises the data record and the hash value of the data block comprises:
   if N =1, giving a hash value and a block height of the initial data block based on a predetermined methodology; and
   if N >1:
      determining the hash value of the Nth data block based on the data record to be written into the Nth data block and a hash value of a (N−1)th data block; and
      generating the Nth data block that comprises the hash value of the Nth data block, the data record to be written into the Nth data block, and a block generation time of the Nth data block.

6. The computer-implemented method according to claim 1, further comprising generating the time service certificate by:
   determining a target ledger that needs time service authentication, wherein the target ledger comprises a plurality of data blocks with consecutive block heights;
   generating a Merkle tree corresponding to the target ledger based on a block height sequence of the plurality of data blocks in the target ledger;

determining a root hash of the Merkle tree corresponding to the target ledger based on a block hash of each of the plurality of data blocks in the target ledger;

using the root hash of the Merkle tree corresponding to the target ledger as a root hash of the target ledger;

sending the root hash of the target ledger and information of the plurality of data blocks to a time authority, wherein the information of the plurality of data blocks comprises a start data block height of the target ledger and an end data block height of the target ledge; and receiving a time service certificate that corresponds to the target ledger and that is returned by the time authority, wherein the time service certificate comprises the start data block height of the target ledger, the end data block height of the target ledger, a trusted timestamp of the target ledger, and the root hash of the target ledger.

7. The computer-implemented method according to claim 6, wherein the determining a target ledger that needs time service authentication comprises:

determining each new data block as a target ledger; or determining, based on a start data block height and an end data block height specified by a user instruction, a continuous segment of a ledger that comprises one or more data blocks starting from the start data block height to the end data block height specified by the user instruction as the target ledger.

8. A non-transitory, computer-readable medium storing one or more instructions executable by a computer system to perform one or more operations for ledger verification, comprising:

determining, by a centralized database service provider that stores data in a ledger that comprises a plurality of data blocks stored in a blockchain data structure, at least one time service certificate, wherein each of the at least one time service certificate corresponds to a segment of the ledger that is continuous, the each of the at least one time service certificate comprises a start data block height, an end data block height, a trusted timestamp, and a root hash of the segment of the ledger, and the at least one time service certificate clarifies a generation time of the segment of the ledger;

obtaining hash values of data blocks between the start data block height and the end data block height;

constructing a Merkle tree corresponding to the segment of the ledger;

determining a root hash of the Merkle tree; and verifying consistency between the root hash of the segment of the ledger and the root hash of the Merkle tree, wherein in the ledger, except for an initial data block, each of the plurality of data blocks comprises at least one data record and comprises its own hash value that is determined by the at least one data record comprised in the data block and a hash value of a previous data block, and block heights of data blocks are increased monotonically according to a block generation time sequence.

9. The non-transitory, computer-readable medium according to claim 8, wherein the at least one time service certificate comprises a plurality of time service certificates, and the operations further comprise:

determining a plurality of segments of ledgers corresponding to the plurality of time service certificates and a plurality of trusted timestamps comprised in the plurality of time service certificates, respectively; and sequentially verifying the plurality of segments of ledgers in a chronological order of the plurality of trusted timestamps.

10. The non-transitory, computer-readable medium according to claim 8, wherein determining at least one time service certificate comprises:

receiving an input data block height; and obtaining a time service certificate from a pre-established time service certificate index based on the input data block height, wherein the pre-established time service certificate index comprises a mapping relationship among a data block height, a data block hash value, and the time service certificate.

11. The non-transitory, computer-readable medium according to claim 8, wherein the one or more operations further comprise generating a data block in advance at the centralized database service provider by:

receiving a data record to be written in an Nth data block;

determining a hash value of the data record; and if a predetermined block generation condition is reached:

determining the data record; and generating the Nth data block that comprises the data record and the hash value of the data block.

12. The non-transitory, computer-readable medium according to claim 11, wherein generating the Nth data block that comprises the data record and the hash value of the data block comprises:

if N =1, giving a hash value and a block height of the initial data block based on a predetermined methodology; and if N >1:

determining the hash value of the Nth data block based on the data record to be written into the Nth data block and a hash value of a (N−1)th data block; and generating the Nth data block that comprises the hash value of the Nth data block, the data record to be written into the Nth data block, and a block generation time of the Nth data block.

13. The non-transitory, computer-readable medium according to claim 8, wherein the one or more operations further comprise generating the time service certificate by:

determining a target ledger that needs time service authentication, wherein the target ledger comprises a plurality of data blocks with consecutive block heights;

generating a Merkle tree corresponding to the target ledger based on a block height sequence of the plurality of data blocks in the target ledger;

determining a root hash of the Merkle tree corresponding to the target ledger based on a block hash of each of the plurality of data blocks in the target ledger;

using the root hash of the Merkle tree corresponding to the target ledger as a root hash of the target ledger;

sending the root hash of the target ledger and information of the plurality of data blocks to a time authority, wherein the information of the plurality of data blocks comprises a start data block height of the target ledger and an end data block height of the target ledge; and receiving a time service certificate that corresponds to the target ledger and that is returned by the time authority, wherein the time service certificate comprises the start data block height of the target ledger, the end data block height of the target ledger, a trusted timestamp of the target ledger, and the root hash of the target ledger.

14. The non-transitory, computer-readable medium according to claim 13, wherein the determining a target ledger that needs time service authentication comprises:

determining each new data block as a target ledger; or determining, based on a start data block height and an end data block height specified by a user instruction, a continuous segment of a ledger that comprises one or more data blocks starting from the start data block height to the end data block height specified by the user instruction as the target ledger.

15. A computer-implemented system for ledger verification, comprising:
one or more computers; and
one or more computer memory devices interoperably coupled with the one or more computers and having tangible, non-transitory, machine-readable media storing one or more instructions that, if executed by the one or more computers, perform one or more operations, comprising:
determining, by a centralized database service provider that stores data in a ledger that comprises a plurality of data blocks stored in a blockchain data structure, at least one time service certificate, wherein each of the at least one time service certificate corresponds to a segment of the ledger that is continuous, the each of the at least one time service certificate comprises a start data block height, an end data block height, a trusted timestamp, and a root hash of the segment of the ledger, and the at least one time service certificate clarifies a generation time of the segment of the ledger;
obtaining hash values of data blocks between the start data block height and the end data block height;
constructing a Merkle tree corresponding to the segment of the ledger;
determining a root hash of the Merkle tree; and
verifying consistency between the root hash of the segment of the ledger and the root hash of the Merkle tree, wherein in the ledger, except for an initial data block, each of the plurality of data blocks comprises at least one data record and comprises its own hash value that is determined by the at least one data record comprised in the data block and a hash value of a previous data block, and block heights of data blocks are increased monotonically according to a block generation time sequence.

16. The computer-implemented system according to claim 15, wherein the at least one time service certificate comprises a plurality of time service certificates, and the one or more operations further comprise:
determining a plurality of segments of ledgers corresponding to the plurality of time service certificates and a plurality of trusted timestamps comprised in the plurality of time service certificates, respectively; and
sequentially verifying the plurality of segments of ledgers in a chronological order of the plurality of trusted timestamps.

17. The computer-implemented system according to claim 15, wherein determining at least one time service certificate comprises:
receiving an input data block height; and
obtaining a time service certificate from a pre-established time service certificate index based on the input data block height, wherein the pre-established time service certificate index comprises a mapping relationship among a data block height, a data block hash value, and the time service certificate.

18. The computer-implemented system according to claim 15, wherein the one or more operations further comprise generating a data block in advance at the centralized database service provider by:
receiving a data record to be written in an Nth data block;
determining a hash value of the data record; and
if a predetermined block generation condition is reached, determining the data record; and
generating the Nth data block that comprises the data record and the hash value of the data block, wherein generating the Nth data block that comprises the data record and the hash value of the data block comprises:
if N =1, giving a hash value and a block height of the initial data block based on a predetermined methodology; and
if N >1:
determining the hash value of the Nth data block based on the data record to be written into the Nth data block and a hash value of a (N−1)th data block; and
generating the Nth data block that comprises the hash value of the Nth data block, the data record to be written into the Nth data block, and a block generation time of the Nth data block.

19. The computer-implemented system according to claim 15, wherein the one or more operations further comprise generating the time service certificate by:
determining a target ledger that needs time service authentication, wherein the target ledger comprises a plurality of data blocks with consecutive block heights;
generating a Merkle tree corresponding to the target ledger based on a block height sequence of the plurality of data blocks in the target ledger;
determining a root hash of the Merkle tree corresponding to the target ledger based on a block hash of each of the plurality of data blocks in the target ledger;
using the root hash of the Merkle tree corresponding to the target ledger as a root hash of the target ledger;
sending the root hash of the target ledger and information of the plurality of data blocks to a time authority, wherein the information of the plurality of data blocks comprises a start data block height of the target ledger and an end data block height of the target ledge; and
receiving a time service certificate that corresponds to the target ledger and that is returned by the time authority, wherein the time service certificate comprises the start data block height of the target ledger, the end data block height of the target ledger, a trusted timestamp of the target ledger, and the root hash of the target ledger.

20. The computer-implemented system according to claim 19, wherein the determining a target ledger that needs time service authentication comprises:
determining each new data block as a target ledger; or
determining, based on a start data block height and an end data block height specified by a user instruction, a continuous segment of a ledger that comprises one or more data blocks starting from the start data block height to the end data block height specified by the user instruction as the target ledger.

* * * * *

UNITED STATES PATENT AND TRADEMARK OFFICE
CERTIFICATE OF CORRECTION

PATENT NO. : 10,790,968 B2  
APPLICATION NO. : 16/815882  
DATED : September 29, 2020  
INVENTOR(S) : Yang Page 1 of 1

It is certified that error appears in the above-identified patent and that said Letters Patent is hereby corrected as shown below:

In the Claims

Column 13/Line 10 – In Claim 6, delete "ledge;" and insert -- ledger; -- therefor.

Column 14/Line 54 – In Claim 13, delete "ledge;" and insert -- ledger; -- therefor.

Column 16/Line 44 – In Claim 19, delete "ledge;" and insert -- ledger; -- therefor.

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*